(12) United States Patent
Micheletti et al.

(10) Patent No.: US 10,144,797 B2
(45) Date of Patent: Dec. 4, 2018

(54) ISOCYANATE-REACTIVE FORMULATION FOR RIGID POLYURETHANE FOAM

(71) Applicant: Dow Global Technologies LLC, Midland, MI (US)

(72) Inventors: Davide Micheletti, Formigine (IT); Rossella Riccio, Correggio (IT); Jean-Paul Masy, Destelbergen (BE); Vanni Parenti, Campagnola (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/557,518

(22) PCT Filed: Mar. 2, 2016

(86) PCT No.: PCT/US2016/020353
§ 371 (c)(1),
(2) Date: Sep. 12, 2017

(87) PCT Pub. No.: WO2016/148914
PCT Pub. Date: Sep. 22, 2016

(65) Prior Publication Data
US 2018/0051121 A1 Feb. 22, 2018

(30) Foreign Application Priority Data
Mar. 17, 2015 (IT) .............. M2015A00405

(51) Int. Cl.
*C08G 18/48* (2006.01)
*C08G 18/50* (2006.01)
*C08G 18/76* (2006.01)
*C08G 18/16* (2006.01)
C08G 101/00 (2006.01)

(52) U.S. Cl.
CPC ......... *C08G 18/482* (2013.01); *C08G 18/163* (2013.01); *C08G 18/4825* (2013.01); *C08G 18/4829* (2013.01); *C08G 18/4879* (2013.01); *C08G 18/5033* (2013.01); *C08G 18/7664* (2013.01); *C08G 2101/0025* (2013.01)

(58) Field of Classification Search
CPC .............. C08G 18/163; C08G 18/482; C08G 18/4825; C08G 18/4829; C08G 18/4879; C08G 18/5033; C08G 18/7664; C08G 2101/0025
See application file for complete search history.

(56) References Cited

U.S. PATENT DOCUMENTS

| | | | |
|---|---|---|---|
| 6,602,450 B1 | 8/2003 | Sato et al. | |
| 6,602,925 B1* | 8/2003 | Van Den Bosch | .. C08G 18/482 521/170 |
| 8,557,886 B2 | 10/2013 | Golini et al. | |
| 2006/0052467 A1 | 3/2006 | Pignagnoli et al. | |
| 2007/0232712 A1* | 10/2007 | Emge | ............ C08G 18/482 521/176 |
| 2012/0009414 A1 | 1/2012 | Golini | |
| 2012/0010309 A1* | 1/2012 | Golini | ............ C08G 18/4027 521/88 |
| 2013/0251980 A1* | 9/2013 | Pellacani | ........... C08G 18/4027 428/318.6 |
| 2015/0065592 A1* | 3/2015 | Girotti | ............ C08G 18/092 521/106 |

FOREIGN PATENT DOCUMENTS

| | | |
|---|---|---|
| WO | 2007058793 A1 | 5/2007 |
| WO | 2010046361 A1 | 4/2010 |
| WO | 2010/111021 A1 | 9/2010 |
| WO | 2010/114695 A1 | 10/2010 |
| WO | 2010/114703 A1 | 10/2010 |
| WO | 2012/083038 A1 | 6/2012 |

OTHER PUBLICATIONS

PCT/US2016/020353, International Search Report and Written Opinion dated May 13, 2016.
PCT/US2016/020353, International Preliminary Report on Patentability dated Sep. 19, 2017.

* cited by examiner

Primary Examiner — John M Cooney

(57) ABSTRACT

A storage stable isocyanate-reactive composition includes a reactive component including (a) 5 wt % to 30 wt % of at least one Novolac-type polyoxypropylene polyether polyol having a hydroxyl functionality from 2 to 5 and a hydroxyl number from 130 to 450 mg KOH/g, (b) 20 wt % to 60 wt % of at least one high functional polyether polyol having a hydroxyl functionality from 6 to 8 and a hydroxyl number from 300 to 700 mg KOH/g, (c) 2 wt % to 30 wt % of at least one low functional polyether polyol having a hydroxyl functionality from 2 to 5 and a hydroxyl number from 50 to 400 mg KOH/g, (d) 2 wt % to 30 wt % of at least one amine initiated polyol having a hydroxyl number from 250 to 600 mg KOH/g, and (e) 1 wt % to 25 wt % of one or more additives; and a hydrocarbon physical blowing agent component in an amount of at least 10 parts by weight for each 100 parts by weight of the reactive component.

8 Claims, No Drawings

ISOCYANATE-REACTIVE FORMULATION FOR RIGID POLYURETHANE FOAM

FIELD

Embodiments relate to a storage stable isocyanate-reactive formulation that includes a Novolac-type polyoxypropylene polyol, and may exclude any polyester polyols, a rigid polyurethane foam prepared using the isocyanate-reactive formulation, and appliances that include the rigid polyurethane foam prepared using the isocyanate-reactive formulation.

INTRODUCTION

Polyurethane based rigid foams are used as insulating materials, e.g., in appliances such as dishwashers and refrigerators. These rigid foams are prepared as the reaction product of an isocyanate component (e.g., that includes a polyisocyanate and/or an isocyanate-terminated prepolymer) and an isocyanate-reactive component that includes one or more polyols, one or more polyamines, and/or one or more aminoalcohols. Of the one or more polyols, typically a polyester polyol is included, e.g., as discussed in Publication Nos. WO 2010/114703, WO 2010/114695, WO 2010/111021, and WO 2012/083038. However, polyurethane based foams formed using polyester polyols could have a relatively higher rate of expansion after demolding. Further, when the isocyanate-reactive component includes a hydrocarbon based blowing agent such as cyclopentane, with respect to storage stability (e.g., clear/hazy appearance in comparison to phase separation) there is strict limit on the amount of the blowing agent that can be used in the component. Accordingly, alternatives are sought.

SUMMARY

Embodiments may be realized by providing a storage stable isocyanate-reactive composition for forming a rigid polyurethane foam. The isocyanate-reactive composition includes a reactive component and a hydrocarbon physical blowing agent component. The reactive component includes, based on the total weight of the reactive component, from: (a) 5 wt % to 30 wt % of at least one Novolac-type polyoxypropylene polyether polyol having a nominal hydroxyl functionality from 2 to 5 and a hydroxyl number from 130 to 450 mg KOH/g, (b) 20 wt % to 60 wt % of at least one high functional polyether polyol having a nominal hydroxyl functionality from 6 to 8 and a hydroxyl number from 300 to 700 mg KOH/g, (c) 2 wt % to 30 wt % of at least one low functional polyether polyol having a nominal hydroxyl functionality from 2 to 5 and a hydroxyl number from 50 to 400 mg KOH/g, (d) 2 wt % to 30 wt % of at least one amine initiated polyol having a hydroxyl number from 250 to 600 mg KOH/g, the amine initiated polyol being an aromatic amine initiated polyol, a cycloaliphatic amine initiated polyol, or an aromatic and cycloaliphatic amine initiated polyol, and (e) 1 wt % to 25 wt % of one or more additives selected from a catalyst, a chemical blowing agent, and a surfactant. The hydrocarbon physical blowing agent component is present in an amount of at least 10 parts by weight for each 100 parts by weight of the reactive component. The storage stable isocyanate-reactive composition does not exhibit phase separation, as determined by unenhanced visual inspection, for a period of at least 7 days at ambient conditions.

DETAILED DESCRIPTION

Embodiments relate to a stable isocyanate-reactive formulation that includes a Novolac-type polyoxypropylene polyol, and may exclude any polyester polyols. Embodiments also relate to a rigid polyurethane foam prepared using the isocyanate-reactive formulation that includes a Novolac-type polyoxypropylene polyol formulation, and appliances that include the rigid polyurethane foam. In particular, the isocyanate-reactive formulation includes a reactive component and a hydrocarbon physical blowing agent. The reactive component includes at least one Novolac-type polyoxypropylene polyether polyol, at least one high functional polyether polyol, at least one low functional polyether polyol, of at least one amine initiated polyol, and of one or more additives, which additives may include catalyst, a chemical blowing agent, and/or a surfactant. The reactive component may include at least one water-initiated or propylene glycol propoxylated polyol. In exemplary embodiments, the reactive component includes a propylene glycol initiated propoxylated polyol. The hydrocarbon physical blowing agent includes at least one hydrocarbon physical blowing agent such as cyclopentane.

The reactive component includes from 5 wt % to 30 wt % (e.g., from 5 wt % to 25 wt %, from 5 wt % to 20 wt %, from 10 wt % to 20 wt %, from 10 wt % to 15 wt %, etc.), based on the total weight of the reactive component, of at least one Novolac-type polyoxypropylene polyether polyol having a nominal hydroxyl functionality from 2 to 5 and a hydroxyl number from 130 to 450 mg KOH/g (e.g., from 150 to 450 mg KOH/g, from 200 to 400 mg KOH/g, from 200 to 300 mg KOH/g, etc.). For example, the reactive component may include from 5 wt % to 30 wt % of one or more of such Novolac-type polyoxypropylene polyether polyols.

The reactive component further includes from 20 wt % to 60 wt % (e.g., from 25 wt % to 60 wt %, from 30 wt % to 60 wt %, from 35 wt % to 60 wt %, from 40 wt % to 60 wt %, from 45 wt % to 55 wt %, etc.), based on the total weight of the reactive component, of at least one high functional polyether polyol having a nominal hydroxyl functionality from 6 to 8 and a hydroxyl number from 300 to 700 mg KOH/g (e.g., from 400 to 600 mg KOH/g, from 450 to 550 mg KOH/g, etc.). For example, the reactive component may include from 20 wt % to 60 wt % of one or more of such high functional polyether polyols.

The reactive component also includes from 2 wt % to 30 wt % (e.g., from 5 wt % to 25 wt %, from 5 wt % to 20 wt %, from 10 wt % to 20 wt %, from 10 wt % to 15 wt %, etc.), based on the total weight of the reactive component, of at least one low functional polyether polyol having a nominal hydroxyl functionality from 2 to 5 and a hydroxyl number from 50 to 400 mg KOH/g (e.g., 100 to 300 mg KOH/g, 100 to 200 mg KOH/g, etc.). In exemplary embodiments, the reactive component includes two different low functional polyether polyols, e.g., each present in an amount less than 10 wt % and greater than 2 wt % based on the total weight of the reactive component. For example, a diol and a triol together may comprise the at least one low functional polyether polyol. The hydroxyl functionality (nominal and actual measured) of the low functional polyether polyol is less than the hydroxyl functionality of the high functional polyether polyol. For example, the reactive component may include from 2 wt % to 30 wt % of one or more of such low functional polyether polyols.

The reactive component further includes from 2 wt % to 30 wt % (e.g., from 5 wt % to 25 wt %, from 5 wt % to 20 wt %, from 10 wt % to 20 wt %, from 10 wt % to 15 wt %, etc.), based on the total weight of the reactive component, of at least one amine initiated polyol having a hydroxyl number from 250 to 600 mg KOH/g (e.g., 300 to 600 mg KOH/g, 350 to 550 mg KOH/g, 400 to 500 mg KOH/g, etc.). The amine initiated polyol is an aromatic amine initiated polyol, a cycloaliphatic amine initiated polyol, or an aromatic and cycloaliphatic amine initiated polyol. The amine initiated polyol may have a nominal hydroxyl functionality from 2 to 8 (e.g., from 2 to 6, from 2 to 5, etc.). For example, the reactive component may include from 2 wt % to 30 wt % of one or more such amine initiated polyols.

The reactive component also includes from 1 wt % to 25 wt % of one or more additives, which additives may include a catalyst, a chemical blowing agent, and/or a surfactant, based on the total weight of the reactive component. For example, the reactive component may include from 1 wt % to 25 wt % total of each of one or more catalysts, one or more chemical blowing agents, and one or more surfactants.

Each of the polyols in the isocyanate-reactive composition may be prepared by alkoxylation. To accomplish the alkoxylation, the alkylene oxide or mixture of alkylene oxides may be added to the initiator(s) in any order, and can be added in any number of increments or added continuously. For example, adding more than one alkylene oxide to the reactor at a time may result in a block having a random distribution of the alkylene oxide molecules, a so-called heteric block. To make a block polyoxy-alkylene of a selected alkylene oxide, a first charge of alkylene oxide may be added to an initiator molecule in a reaction vessel. After the first charge, a second charge may be added and the reaction may go to substantial completion. Where the first charge and the second charge have different relative compositions of alkylene oxides, the result may be a block polyoxyalkylene. It is possible to make block polyols in this fashion in which the blocks thus formed are all ethylene oxide, all propylene oxide, all butylene oxide, or combinations thereof. The blocks may be added in any order, and there may be any number of blocks. For example, it is possible to add a first block of ethylene oxide, followed by a second block of propylene oxide. Alternatively, a first block of propylene oxide may be added, followed by a block of ethylene oxide. Third and subsequent blocks may also be added. The composition of all the blocks may be chosen so as to arrive at specific material properties based on the intended use.

Novolac-Type PO Polyether Polyol

Novolac-type polyether polyols are the propoxylation products of a phenol-formaldehyde resin, which is formed by the elimination reaction of phenol with formaldehyde in the presence of an acid catalyst (such as glacial acetic acid) followed by concentrated hydrochloric acid. In other words, the Novolac-type polyether polyol is made by reacting a condensate adduct of phenol and formaldehyde with propylene oxide. In embodiments, the use of one or more other alkylene oxides such as ethylene oxide and butylene oxide are both excluded or used in a total amount of less than 5 wt % (based on the total weight of alkylene oxides used to make the Novolac-type polyether polyol), such that Novolac-type polyether polyol essentially a propoxylation product (essentially derived from propylene oxide).

To form the Novolac-type polyether polyol, a small amount of the acid catalyst or catalysts may be added to a miscible phenol, such as p-toluenesulfonic acid, followed by formaldehyde. The formaldehyde will react between two phenols to form a methylene bridge, creating a dimer by electrophilic aromatic substitution between the ortho and para positions of phenol and the protonated formaldehyde. This dimer may be, e.g., bisphenol F or bisphenol A. As concentration of dimers increase, trimers, tetramers, and higher oligomers may also form. However, because the molar ratio of formaldehyde to phenol is controlled at somewhat less than 1, polymerization is not completed. Thus, the Novolac-type polyol may then be alkoxylated to build molecular weight to a desired level. Novolac-initiated polyols are disclosed in, e.g., U.S. Pat. Nos. 2,838,473; 2,938,884; 3,470,118; and 3,686,101.

Phenols that may be used to prepare the Novolac initiator include, by way of example only: o-, m-, or p-cresols, ethylphenol, nonylphenol, p-phenylphenol, 2,2-bis(4-hydroxyphenol) propane, beta-naphthol, beta-hydroxyanthracene, p-chlorophenol, o-bromophenol, 2,6-dichloro-phenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol) ethanol, 2-carbethoxyphenol, 4-chloro-methylphenol, and mixtures thereof. The phenols used to prepare the Novolac-type polyether polyols may be unsubstituted.

For example, the Novolac starting materials may be prepared by reacting a phenol with less than 1 mole of formaldehyde per mole of the phenol in the presence of an acidic catalyst to form a polynuclear condensation product containing from 2 to 5 phenol units per molecule. The Novolac resin is then reacted with propylene oxide to form a propoxylated product containing a plurality of hydroxyl groups.

High Functional Polyether Polyol

The high functional polyether polyol may be a sucrose- and/or sorbitol-initiated polyether polyol. Other initiators include mixtures that having sucrose, sorbitol, and/or at least one other lower functional initiator such that the initiator mixtures have an average functionality with respect to active hydrogen atoms ranging from 3.5 to 7.0. Sucrose may be obtained from sugar cane or sugar beets, honey, sorghum, sugar maple, fruit, and the like, as would be understood by a person of ordinary skill in the art. Sorbitol may be obtained via the hydrogenation of D-glucose over a suitable hydrogenation catalyst, as would be understood by a person of ordinary skill in the art.

For example, the high functional polyether polyol may be made by polymerizing one or more alkylene oxides onto the specified initiator (such as sucrose and/or sorbitol) in the presence of a suitable catalyst. In exemplary embodiments, the only alkylene oxide used is propylene oxide and other alkylene oxides such as ethylene oxide and butylene oxide are excluded and/or used in a total amount less of than 5 wt % based on the total weight of the alkylene oxides used.

Low Functional Polyether Polyol

The low functional polyether polyol may be initiated by a compound having from 2 to 5 active hydrogen atoms. Exemplary imitators include water, propylene glycol, and glycerine.

For example, the low functional polyol may be made by polymerizing one or more alkylene oxides onto the specified initiator in the presence of a suitable catalyst. In exemplary embodiments, the only alkylene oxide used is propylene oxide and other alkylene oxide such as ethylene oxide and butylene oxide are excluded and/or used in a total amount of less than 5 wt % based on the total weight of the alkylene oxides used.

Amine Initiated Polyol

The amine initiated polyol is a polyol prepared using an amine as an initiator and an alkylene oxide such as propylene oxide, ethylene oxide, and/or butylene oxide.

For example, the amine initiated polyol may be made by polymerizing one or more alkylene oxides onto the specified initiator in the presence of a suitable catalyst. In exemplary embodiments, the only alkylene oxide used is propylene oxide and other alkylene oxide such as ethylene oxide and butylene oxide are excluded and/or used in a total amount of less than 5 wt % based on the total weight of the alkylene oxides used. The amine initiator may an aromatic amine, a cycloaliphatic amine, or a combination of an aromatic amine and a cycloaliphatic amine. Exemplary initiators include toluenediamine, phenylenediamine, diaminodiphenylmethane, polyphenyl-polymethylene-polyamine.

For example, the amine initiated polyol may be prepared as follows:

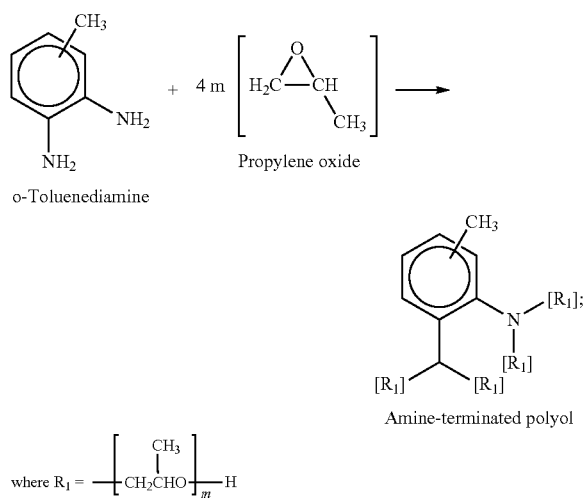

Hydrocarbon Physical Blowing Agent

By physical blowing agent it is meant a blowing agent that is a not a chemical blowing agent. The physical blowing agent may include one or more physical blowing agents. In particular, chemical blowing agents are generally known as reactive blowing agent additives. Physical blowing agents provide no or substantially no chemical reaction when used as a blowing agent. The physical blowing agent may involve a mechanism in which pores are produced in a cellular material to form a foam, which foam making process may involve a reversible and/or endothermic reaction.

In exemplary embodiments, the hydrocarbon physical blowing agent includes one or more of isopentane, n-pentane, cyclopentane, cyclohexane, n-hexane, and 2-methyl pentane. For example, the hydrocarbon physical blowing agent includes at least one cyclopentane. The isocyanate-reactive composition may exclude any hydrofluorocarbon and hydrochlorofluorocarbon blowing agents.

Isocyanate Component

The isocyanate component includes at least one isocyanate. Exemplary isocyanates include aromatic, aliphatic, and cycloaliphatic polyisocyanates and isocyanate-terminated prepolymers derived from using aromatic, aliphatic, and/or cycloaliphatic polyisocyanates. Exemplary isocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for use in rigid polyurethane foams. Exemplary commercially available isocyanate products include PAPI™ products and VORANATE™ products, available from The Dow Chemical Company.

The isocyanate component may include a multifunctional isocyanate, an isocyanate-terminated prepolymer, and/or a quasi-prepolymer. Isocyanate-terminated prepolymers and quasi-prepolymers (mixtures of prepolymers with unreacted polyisocyanate compounds), may be prepared by reacting a stoichiometric excess of a polyisocyanate with a polyol, such as the polyols described above. For example, it is possible that the polyol may be the reactive component in part or in its entirety. For example, methods for preparing prepolymers and quasi-prepolymers known in the art may be used, e.g., known in the art for forming rigid polyurethane foams.

The amount of the isocyanate component used relative to the isocyanate-reactive component in the reaction system for forming a polyurethane foam is expressed as an isocyanate index. For example, the isocyanate index may be from 100 to 300 (e.g., 100 to 200, etc.). The isocyanate index is the equivalents of isocyanate groups (i.e., NCO moieties) present, divided by the total equivalents of isocyanate-reactive hydrogen containing groups (i.e., OH moieties and/or amine moieties) present, multiplied by 100. Considered in another way, the isocyanate index is the ratio of the isocyanate groups over the isocyanate reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

Polyurethane Foam Composition

The curing characteristics of an polyurethane foam forming formulation are important, e.g., with respect to in pour-in-place applications as commonly used to appliance applications. For example, refrigerator, freezer, and/or dishwasher cabinets may be insulated by partially assembling an exterior shell and interior liner, and holding the shell and liner in position such that a cavity is formed therebetween. Then, the polyurethane foam formulation may be introduced into the cavity, where it expands to fill the cavity. The polyurethane foam provides thermal insulation and may impart structural strength to the assembly (e.g., when the foam is a rigid foam).

In exemplary embodiments, the process of preparing the polyurethane foam may be practiced in conjunction with vacuum assisted injection (VAI) methods, e.g., as described in Publication Nos. WO 2007/058793 and/or WO 2010/046361. For example, the foam forming reaction mixture may be injected into a sealed mold cavity that is kept at a reduced pressure. Using the VAI process, the mold pressure is reduced to 300 to 950 mbar (30 to 95 kPa), from 400 to 900 mbar (40 to 90 kPa), and/or from 500 to 850 mbar (50 to 85 kPa), before or immediately after the foam forming composition(s) are charged to the mold.

The manner of curing of the polyurethane foam may be important. For example, with respect to appliance manufacturing, the foam formulation should cure quickly to form a dimensionally stable foam, e.g., so that the finished cabinet can be removed in a timely manner. This characteristic is generally referred to as "demold" time, and directly affects the rate at which cabinets can be produced. Exemplary cabinets include a refrigerator and a dishwasher. Further, the curing characteristics of the system affect a property known as "flow index" or simply "flow". A foam formulation will expand to a certain density (known as the 'free rise density') if permitted to expand against minimal constraints. When the formulation needs to fill a cabinet structure, its expansion is somewhat constrained in several ways. For example, the foam may need to expand mainly in a vertical (rather than horizontal) direction within a narrow cavity. As a result, the formulation should expand against a significant amount of its own weight.

The foam formulation may also need to be capable of flowing around corners and into all portions of wall cavities, as defined by the cabinet structure. Further, the cavity may have limited or no venting, and so the atmosphere in the cavity may exert additional pressure on the expanding foam. Because of these constraints, a greater amount of the foam formulation may be needed to fill the cavity than would be predicted from the free rise density alone. The amount of foam formulation needed to minimally fill the cavity may be expressed as a minimum fill density (i.e., the weight of the formulation divided by the cavity volume). The ratio of the minimum fill density to the free rise density is the flow index. The flow index is ideally 1.0, but is on the order of 1.5 in commercially practical formulations. Lower flow index is preferred to produce lower density foam for appliance applications.

Modifications to foam formulations that favor low k-factor tend to have an adverse effect on demold time and/or flow index. What is desired is a rigid foam formulation that provides a low k-factor foam and which provide for a low flow index and/or a short demold time.

According to exemplary embodiments, the polyurethane composition excludes any polyester polyols. The phrase polyester polyols encompasses polyols that are produced by reaction of polyfunctional acid or anhydride compounds with polyfunctional alcohols, so as to form a polyester functional group within the polyol. For example, the polyurethane composite excludes any aliphatic polyester polyols and any aromatic polyester polyols. Exemplary polyester polyols are discussed in International Publication Nos. WO 2010/114703, WO 2010/114695, WO 2010/111021, and WO 2012/083038.

The polyurethane foam composition may include optional components (one or more of such components may be used) that are known in the art for use in rigid polyurethane foams and known in the art for use in rigid polyurethane foams for appliances (domestic and commercial). Exemplary optional components include flame retardants, crosslinkers, fillers, pigments, dispersing agent, cell stabilizers, and viscosity modifiers. For example, the optional component include halogen based flame retardant, non-halogen based flame retardant, barium sulfate, calcium carbonate, graphite, carbon black, titanium dioxide, iron oxide, microspheres, alumina trihydrate, wollastonite, prepared glass fibers (dropped or continuous), polyester fibers, and other polymeric fibers.

All parts and percentages are by weight, unless otherwise indicated. All molecular weight values are based on number average molecular weight, unless otherwise indicated.

EXAMPLES

The materials principally used are the following:

| | |
|---|---|
| Polyol 1 | A sorbitol initiated propoxylated polyol, having a nominal hydroxyl functionality of 6, a hydroxyl number of from 460 to 495 mg KOH/g, and a number average molecular weight of approximately 700 g/mol (available from The Dow Chemical Company as VORANOL ™ RN 482). |
| Polyol 2 | A glycerine initiated propoxylated polyol, having a nominal hydroxyl functionality of 3, a hydroxyl number of approximately 156 mg KOH/g, and a number average molecular weight of approximately 1000 g/mol (available from The Dow Chemical Company as VORANOL ™ CP 1055). |
| Polyol 3 | A propylene glycol initiated propoxylated polyol, having a nominal hydroxyl functionality of 2, a hydroxyl number from 106 to 114 mg KOH/g, and a number average molecular weight of approximately 1000 g/mol (available from The Dow Chemical Company as VORANOL ™ 1010L). |
| Polyol 4 | A tolulenediamine initiated propoxylated polyol that is an amine terminated polyol, having a nominal hydroxyl functionality of 4 and a hydroxyl number of approximately 430 mg KOH/g (available from The Dow Chemical Company as TERCAROL ™ 5903). |
| Novolac PO Polyol | An aromatic resin-initiated propylene oxide polyol, having an average hydroxyl functionality of approximately 3.4, an hydroxyl number of approximately 252 mg KOH/g, and a viscosity at 50° C. of approximately 6500 cSt. The polyol is synthesized by reaction of a solid phenolic Novolac resin initiator with pure propylene oxide. The phenolic Novolac resin initiator has an hydroxyl number from 531 mg KOH/g to 551 mgKOH/g, a phenol content of approximately 3000 ppm, a water content of approximately 2000 ppm, and is available from The Dow Chemical Company. The synthesis is carried out in 20 L stainless steel reactor. In particular, approximately 6445 grams of the phenolic Novolac resin initiator is added in the reactor with approximately 30.5 grams of a KOH solution at 45% in water. After a vacuum step at 125° C., 6810 grams of propylene oxide is gradually fed to the reactor during a period of approximately 11 hours. Thereafter, the reaction is allowed to continue for a period of approximately 5 hours before the KOH is neutralized by the addition of a stoechiomeric amount of acetic acid. |
| Novolac PO-EO Polyol | An aromatic resin-initiated propylene oxide-ethylene oxide polyol, having an average hydroxyl functionality of approximately 3.4, an hydroxyl number from 189 mg KOH/g to 203 mg KOH/g, and a viscosity at 25° C. from 7000 cSt to 10,000 cSt (available from The Dow Chemical Company as IP 585 Polyol). |
| Polyester 1 | An aromatic polyester polyol (available from The Dow Chemical Company as IP 9006 Polyester Polyol). |
| Modified Polyester 1 | The aromatic polyester polyol IP 9006 modified with glycidyl ether macromolecules, which may act as a hydrocarbon blowing agent compatibilizer, similar to as discussed in PCT Application No: PCT/US14/056699. |
| Polyester 2 | A polyester polyol formulated for rigid foams, having a nominal hydroxyl functionality of 2.0, a hydroxyl number of 240 mg KOH/g, an average molecular weight of 470 g/mol, and a viscosity of 3250 MPa * s (available from Stepan as STEPANPOL ® PS-2352). |
| Surfactant | A polysiloxane polymer based silicone surfactant (available from Evonik under the designation of Tegostab ®). Other exemplary silicone surfactants are available from Momentive. |
| Catalysts | At a total of 3.0 wt %, based on the total weight of the isocyanate-reactive formulation, the catalysts include 0.6 wt % of Catalyst 1 (a tertiary amine catalyst, available as Dabco ® TMR-30 from Air Products), 0.1 wt % of Catalyst 2 (a catalyst that is a solution of potassium-acetate in diethylene glycol, available as Dabco ® K2097 from Air |

-continued

Products), 1.2 wt % of Catalyst 3 - PMDETA (a tertiary amine catalyst, available as Polycat® 5 from Air Products), and 1.1 wt % of Catalyst 4 - DMCHA (a tertiary amine catalyst, available as Polycat® 8 from Air Products).

Isocyanate-Reactive Component Formulations

Isocyanate-reactive formulations of Working Example 1 and Comparative Examples A-D are each blended according to the formulations in Table 1, below.

TABLE 1

|  | Working Example 1 (wt %) | Comparative Example A (wt %) | Comparative Example B (wt %) | Comparative Example C (wt %) | Comparative Example D (wt %) |
| --- | --- | --- | --- | --- | --- |
| Polyol 1 | 49.4 | 49.4 | 49.4 | 49.4 | 49.4 |
| Polyol 2 | 6.3 | 6.3 | 6.3 | 6.3 | 6.3 |
| Polyol 3 | 8.4 | 8.4 | 8.4 | 8.4 | 8.4 |
| Polyol 4 | 13.5 | 13.5 | 13.5 | 13.5 | 13.5 |
| Novolac PO | 13.5 | — | — | — | — |
| Novolac PO-EO | — | 13.5 | — | — | — |
| Polyester 1 | — | — | 13.5 | — | — |
| Modified Polyester 1 | — | — | — | 13.5 | — |
| Polyester 2 | — | — | — | — | 13.5 |
| Surfactant | 3.5 | 3.5 | 3.5 | 3.5 | 3.5 |
| Catalysts | 3.0 | 3.0 | 3.0 | 3.0 | 3.0 |
| Water | 2.4 | 2.4 | 2.4 | 2.4 | 2.4 |
| Isocyanate-Reactive Formulation Properties after 1 week @ at room temperature, mixed with CP (cyclopentane) | | | | | |
| Compatibility with CP 16 parts by weight | Clear | Hazy | Phase Separation | Clear | Hazy |
| Compatibility with CP 18 parts by weight | Hazy | Phase Separation | Phase Separation | Phase Separation | Phase Separation |
| Compatibility with CP 20 parts by weight | Phase Separation | Phase Separation | Phase Separation | Phase Separation | Phase Separation |

Each of the formulations of Working Example 1 and Comparative Examples A-D are evaluated for compatibility with cyclopentane. In particular, the formulations are each separately mixed with 16 parts by weight (based on 100 parts of the isocyanate-reactive formulations), 18 parts by weight, and 20 parts by weight of cyclopentane. These formulations mixed with cyclopentane are kept in a laboratory glass bottle (250 mL) for one week (7 days) at ambient conditions (i.e., room temperature of approximately 20° C. and atmospheric temperature of approximately 1 atm) the appearance of each formulation is visually observed by means of unenhanced visual inspection. Referring to Table 1, by a notation of clear it is meant that the formulation remained substantially clear, similar to when the formulation was first mixed with cyclopentane. By a notation of hazy it is meant that the formulation developed a white appearance, but without an observable amount of phase separation. By a notation of phase separation it is meant that the formulation developed a phase separated appearance, in which it is believed that the cyclopentane and possibly other components precipitated out of a liquid solution that primarily includes polyol. Notations of clear and hazy are interpreted as storage stable formulations, whereas a notation of clear is preferable. A notation of phase separation is interpreted as a non-storage stable formulation.

With respect to Table 1, it is noted that Working Example 1 demonstrates improved storage stability with respect to 16 parts by weight of cyclopentane as compared to Comparative Examples A, B, and D. Further, Working Example 1 demonstrates improved storage stability with respect to 18 parts by weight of cyclopentane as compared to all of Comparative Examples A to D. At 20 parts of by weight of cyclopentane, both Working Example 1 and Comparative Examples A to D demonstrate a phase separated appearance. Overall, Working Example 1 provides for the ability to add at least 18 parts by weight of cyclopentane and still have storage stability (as defined herein), whereas Comparative Examples A to D do not provide for such storage stability.

Foams

Polyurethane based rigid foam samples are prepared using the isocyanate-reactive formulations of Working Example 1 and Comparative Examples B, C, and D, each mixed with 16 parts by weight of cyclopentane, and an isocyanate formulation that consists of VORANATE™ M220 (a polymeric diphenylmethane diisocyanate referred to as PMDI, available from The Dow Chemical Company). In particular, foam samples are prepared using high pressure injection machines and dispensing equipment from Afros-Cannon. The formulated polyols and blowing agent are premixed (i.e., 100 parts by weight of the isocyanate-reactive component and 16 parts by weight of cyclopentane). Each of the formulated polyol, blowing agent, and isocyanate component are processed on a high pressure injection machine at a temperature of 20±2° C. using a mix pressure of 150±20 bar (15000+2000 kPa). The pressure in the mold is approximately 1 atm. The isocyanate index is from 115 to 117 for all the foam samples prepared.

TABLE 2

| | Working Example 2 | Comparative Example E | Comparative Example F | Comparative Example G |
|---|---|---|---|---|
| Foam Formulation | | | | |
| Formulated Polyol (parts by weight) | 100.0 (Working Example 1) | 100.0 (Comparative Example B) | 100.0 (Comparative Example C) | 100.0 (Comparative Example D) |
| Cyclopentane (parts by weight) | 16 | 16 | 16 | 16 |
| Isocyanate | 146 | 147 | 147 | 146 |
| Foam Properties | | | | |
| Cream Time (sec) | 4 | 3 | 3 | 3 |
| Gel Time (sec) | 38 | 34 | 35 | 33 |
| Tack-free time (sec) | 48 | 47 | 44 | 47 |
| FRD 24 hour (kg/m$^3$) | 21.9 | 21.4 | 21.3 | 21.7 |
| Flow Index | 1.332 | 1.364 | 1.358 | 1.326 |
| Brett MFD (kg/m$^3$) | 29.1 | 29.3 | 28.9 | 28.8 |
| Brett Overpacking (%) | 15.0 | 15.2 | 15.5 | 15.5 |
| Brett ADD | 0.6 | 0.5 | 0.6 | 0.5 |
| Brett Molded Density (kg/m$^3$) | 33.5 | 33.7 | 33.2 | 33.3 |
| Brett Skin Compressive Strength Corrected to d = 32 (kg/m$^3$ (kPa) | 129.6 | 132.3 | 128.9 | 127.0 |
| Brett Lamda @ 10° C. Bottom (mW/m * K) | 19.39 | 19.29 | 19.26 | 19.26 |
| Demold expansion at 4 min (mm) | 4.4 | 5.9 | 5.9 | 5.4 |

The foam samples are evaluated for reactivity, flow, density distribution, compressive strength, thermal conductivity and demolding properties. Properties are determined according to the following protocols:

(1) Reactivity and Free Rise Density (FRD): A free rise box foam is prepared to measure the reactivity of the formulation and the FRD of the foam. The cream time, the gel time and the tack free time are recorded during the foam rise. The FRD is measured 24 hours after foaming. Cream time is determined as the time it takes for fine bubbles to appear on a reacting mixture surface of the sample. Gel time is determined as the time it takes for the appearance of tacky material "strings" to appear if a spatula is pulled away after touching a surface of the sample. FRD is measured according to ASTM D-1622.

(2) Foam physical properties: The foam physical properties are evaluated using a Brett mold with the standard dimensions of 200×20×5 cubic centimeters (cm$^3$), filled at a 45° angle and immediately raised to the vertical position. The mold is maintained at 45° C. The minimum fill density (MFD) is determined (which is dependent on the in-mold pressure) and a panel at 15% over-packing (OP) is produced. The over-pack is defined as the Molded Density (MD) divided by the MFD. MD is calculated from the mass of the Brett panel divided by its volume (herein 20 liters). The system flow is measured by the flow index (FI; FI=MFD/FRD). The average density deviation (ADD) is calculated based on the density of specimens cut along the Brett panel scheme shown in Table 3, below.

TABLE 3

| cm | Specimen Number | Method |
|---|---|---|
| 10 | 17 | ADD |
| 10 | 16 | ADD |
| 10 | 15 | ADD |
| 10 | 14 | CS + ADD |

TABLE 3-continued

| cm | Specimen Number | Method |
|---|---|---|
| 10 | 13 | ADD |
| 10 | 12 | ADD |
| 10 | 11 | ADD |
| 10 | 10 | CS + ADD |
| 10 | 9 | ADD |
| 10 | 8 | ADD |
| 10 | 7 | CS + ADD |
| 10 | 6 | ADD |
| 10 | 5 | ADD |
| 10 | 4 | CS + ADD |
| 20 | Lambda bottom | Lambda @ 10° C. |
| 10 | 3 | CS + ADD |
| 10 | 2 | ADD |
| 10 | 1 | ADD |

In particular, ADD is calculated according to the following Formula (1):

$$ADD = \sum_{i=1}^{n} \left| \frac{d - di}{n} \right| \qquad \text{Formula (1)}$$

whereas, n=number of samples; d=average density; di=density of the i$^{th}$ sample.

Compressive strength (CS) and ADD samples are obtained from evenly spaced dimensioned samples cut along the length of the Brett panel, as shown in Table 3. CS is measured according to ISO 844 on 5 specimens along the Brett panel. All CS samples reported are measured at 10% deflection.

Brett Lambda, i.e., thermal conductivity (Lambda), is measured according to ISO 12939-01/DIN 52612 and are carried out with LaserComp© Fox 200 equipment at an average temperature of 10.0° C. In particular, Brett Lambda is measured as amount of heat that is transferred through the foam as dependent on mass, length, time, and temperature.

Demold expansion is determined using a Jumbo Mold (70×40×10 cm$^3$) maintained at 45° C. Jumbo panels produced with an overpack factor (OP) level of 15% are demolded at 6 minutes plus 2 minutes curing time. The post expansion of the foam is measured 24 hours after demolding.

With respect to Foam samples for Working Example 2 and Comparative Examples E to G, it is seen that a significant improvement is realized with respect to demold expansion when the Novolac PO polyol is used in the polyol formulation (i.e., in the isocyanate-reactive component), while overall foam and foam formation properties are similar to that of Comparative Examples E to G. For example, Working Example 2 realizes an improvement with respect to demold expansion while still realizing a good Brett Lambda, i.e., thermal conductivity, which results in good thermal insulation.

The invention claimed is:

1. A storage stable isocyanate-reactive composition for forming a rigid polyurethane foam, the composition comprising:
   a reactive component including, based on the total weight of the reactive component, from:
   (a) 5 wt % to 30 wt % of at least one Novolac-type polyoxypropylene polyether polyol having a nominal hydroxyl functionality from 2 to 5 and a hydroxyl number from 130 to 450 mg KOH/g,
   (b) 20 wt % to 60 wt % of at least one high functional polyether polyol having a nominal hydroxyl functionality from 6 to 8 and a hydroxyl number from 300 to 700 mg KOH/g,
   (c) 2 wt % to 30 wt % of at least one low functional polyether polyol having a nominal hydroxyl functionality from 2 to 5 and a hydroxyl number from 50 to 400 mg KOH/g,
   (d) 2 wt % to 30 wt % of at least one amine initiated polyol having a hydroxyl number from 250 to 600 mg KOH/g, the amine initiated polyol being an aromatic amine initiated polyol, a cycloaliphatic amine initiated polyol, or an aromatic and cycloaliphatic amine initiated polyol, and
   (e) 1 wt % to 25 wt % of one or more additives selected from a catalyst, a chemical blowing agent, and a surfactant; and
   a hydrocarbon physical blowing agent component present in an amount of at least 10 parts by weight for each 100 parts by weight of the reactive component,
   wherein the isocyanate-reactive composition does not exhibit phase separation, as determined by unenhanced visual inspection, for a period of at least 7 days at ambient conditions.

2. The composition as claimed in claim 1, wherein the composition excludes any polyester polyols.

3. The composition as claimed in claim 1, wherein the amount of hydrocarbon physical blowing agent is at least 16 parts by weight and less than 20 parts by weight for each 100 parts by weight of the reactive component.

4. The composition as claimed in claim 1, wherein the reactive component includes a diol and a triol as low functional polyether polyols, each of the diol and triol being present in an amount less than 10 wt %, based on the total weight of the reactive component.

5. The composition as claimed in a claim 1, wherein the hydrocarbon physical blowing agent includes one or more of isopentane, n-pentane, cyclopentane, cyclohexane, n-hexane, and 2-methyl pentane.

6. A reaction system for forming a rigid polyurethane foam, the system comprising:
   (a) the storage stable isocyanate-reactive composition for forming a rigid polyurethane foam as claim 1; and
   (b) an isocyanate component, the reaction system having an isocyanate index from 100 to 300.

7. A rigid polyurethane foam prepared using the reaction system as claimed in claim 6.

8. An appliance that includes the rigid polyurethane foam of claim 7.

* * * * *